US006274653B1

(12) United States Patent
Hecht et al.

(10) Patent No.: US 6,274,653 B1
(45) Date of Patent: Aug. 14, 2001

(54) BONDING AGENT PREPARATIONS FOR PAINTS, THE PRODUCTION AND USE THEREOF

(75) Inventors: Reinhold Hecht, Wilhelmsthal; Lutz Hoppe, Walsrode; Erhard Lühmann, Bomlitz, all of (DE)

(73) Assignee: Wolff Walsrode AG, Walsrode (DE)

(*) Notice: Subject to any disclaimer, the term of this patent is extended or adjusted under 35 U.S.C. 154(b) by 0 days.

(21) Appl. No.: 09/380,859
(22) PCT Filed: Feb. 26, 1998
(86) PCT No.: PCT/EP98/01095
   § 371 Date: Sep. 7, 1999
   § 102(e) Date: Sep. 7, 1999
(87) PCT Pub. No.: WO98/40433
   PCT Pub. Date: Sep. 17, 1998
(30) Foreign Application Priority Data
Mar. 10, 1997 (DE) .............................. 197 09 702
(51) Int. Cl.⁷ ................................ C08L 1/10; C08L 1/20
(52) U.S. Cl. ................................................ 524/29; 524/37
(58) Field of Search .......................................... 524/29, 37

(56) References Cited

U.S. PATENT DOCUMENTS

| 3,284,253 | 11/1966 | Ender et al. . | |
| 3,948,675 | 4/1976 | Rat et al. | 106/195 |
| 4,483,714 | 11/1984 | Yamaue et al. | 106/279 |
| 5,362,313 | * 11/1994 | Hoppe et al. | 524/37 |
| 5,484,826 | * 1/1996 | Kressdorf et al. | 524/35 |

FOREIGN PATENT DOCUMENTS

| 1203652 | 10/1965 | (DE) . |
| 1470860 | 2/1969 | (DE) . |
| 1051561 | 12/1966 | (GB) . |

\* cited by examiner

*Primary Examiner*—Nathan M. Nutter
(74) *Attorney, Agent, or Firm*—Joseph C. Gil; Aron Preis; James R. Franks

(57) ABSTRACT

A plasticized composition comprising 40 to 82 percent cellulose nitrate, having nitrogen content of less than 12.6% relative to the weight of said cellulose nitrate, and 18 to 60 percent formylated polyurethane, said percent, both occurrences, being relative to the weight of the composition, is disclosed. The plasticized composition is suitable for use in preparing paints.

7 Claims, No Drawings ns BONDING AGENT PREPARATIONS FOR PAINTS, THE PRODUCTION AND USE THEREOF

CROSS REFERENCE TO RELATED PATENT APPLICATIONS

The present patent application claims the right of priority under 35 U.S.C. 119 and 35 U.S.C. 365 of International Application No. PCT/EP98/01095, filed Feb. 26, 1998, which was published in German as International Patent Application No. WO 98/40433 on Sep. 17, 1998, which is entitled to the right of priority of German Patent Application No. 197 09 702.2, filed Mar. 10, 1997.

FIELD OF THE INVENTION

The present invention relates to new cellulose nitrate/plasticizer combinations comprising 82–40 wt. % cellulose nitrate with a nitrogen content of less than 12.6 wt. % and 18–60 wt. % formylated polyurethanes as plasticizers.

BACKGROUND OF THE INVENTION

Cellulose nitrate is known as an essential constituent of many paint systems (cf. e.g. U. Biethan, Lacke und Lösemittel [Paints and Solvents], Verlag Chemie GmbH, Weinheim, 1st edition, 1979, p. 8).

Since cellulose nitrate in the dry form can be made to ignite very easily by impact or friction, commercially available paint cellulose nitrates must be treated either with a stabilizing agent (e.g. humidifying agent) in an amount of at least 25 wt. % or a gelatinizing plasticizer in a concentration of at least 18 wt. % in order to reduce risks during storage, handling and transportation.

In addition to water, in general alcohols, such as ethanol, isopropanol and butanol, are used as humidifying agents. However, in the processing of paints containing cellulose nitrate, alcohols cause trouble in the conventional adsorption units installed downstream of painting units to reduce emissions. Alcohols also cause trouble when used in PU paints. They react with isocyanates to give low molecular weight compounds, as a result of which the quality of the paint film is reduced significantly.

DE-A 30 41 085 and U.S. Pat. No. 3,284,253 describe cellulose nitrates which contain inert solvents (e.g. toluene) as a humidifying agent. They are prepared by means of a distillative working step, which is exceptionally expensive and presents safety problems.

All cellulose nitrates provided with humidifying agents continue to have the problem of evaporation of the humidifying agent or inhomogeneous distribution as a result of sagging during storage in a drum.

So that the user has a free choice of solvent which can be employed, cellulose nitrate is also available in plasticized form (so-called NC chips). These NC chips are generally prepared by incorporating plasticizers into water-moist cellulose nitrates. The preparation is described e.g. in DE 1 203 652, DE 1 570 121, DE 1 470 860 and DE 2 338 852.

Prerequisites for the preparation of NC chips are gelatinizing plasticizers in a pure form or those plasticizers which acquire gelatinizing properties by an addition of organic solvents which dissolve cellulose nitrate. These organic solvents are removed again during drying. Environmental technology measures are therefore necessary in such a preparation process, in order to ensure the legally required emission values and explosion limits are adhered to.

In addition to the gelatinizing power of the plasticizers with respect to the cellulose nitrate, additional plasticizer properties such as acceptability in terms of foodstuffs legislation, resistance to migration and good general mechanical and chemical properties are required by the market as a basic prerequisite for the preparation of NC chips.

It is known that polyurethanes meet a large number of the properties required. They are distinguished e.g. by good resistance to chemicals, resistance to heat, fastness to light (in the case of polyurethanes based on aliphatic isocyanates) and very good mechanical properties.

The preparation of cellulose nitrates plasticized with polyurethane oils is described in DOS 2 215 624. According to the invention, an aqueous suspension of the plasticizing agent is brought together with an aqueous suspension of cellulose nitrate fibres with vigorous stirring. The resulting product is filtered off, squeezed off, shaped by calendering, dried and cut to chips. Anionic and/or nonionic emulsifiers are employed for the preparation of the suspension of the plasticizing agent, and these remain in the NC chips after the preparation process and impair in an undesirable manner the resistance to chemicals and in particular the resistance to water of coatings produced therefrom.

To avoid the disadvantages described, it would be desirable to be able to prepare such NC chips by direct application of polyurethane plasticizers on to the NC fibres. However, this has hitherto not been possible because of the lack of gelatinizing power of polyurethane plasticizers or polyurethane oils known to date.

SUMMARY OF THE INVENTION

The aim of the present invention was to allow a direct and therefore economical application to the NC fibres by using specially modified polyurethane plasticizers, and to arrive at a homogeneous and uniformly gelatinized product without having to resort to additional aids such as organic solvents or emulsifiers.

Surprisingly, it has been found that by using formylated polyurethanes, the gelatinizing power of these polymeric plasticizers with respect to nitrocellulose can be increased, so that the abovementioned object is achieved.

DETAILED DESCRIPTION OF THE INVENTION

Formylated polyurethanes are obtainable, e.g., under the commercial name CENTROPLAST® formylated polyurethane, and are distinguished by fastness to light, resistance to heat and non-hydrolysability. They furthermore have FDA and BGA [German Board of Health] approval. The molecular weights of these plasticizers are between 900 and 2,000 g/mol.

Cellulose nitrates with a nitrogen content of less than 12.6 wt. % are employed for the preparation of the cellulose nitrate/plasticizer mixtures according to the invention. Commercially available cellulose nitrates of various viscosity levels with a nitrogen content of 10.0–12.6 wt. % are particularly preferred.

Preferred cellulose nitrate/plasticizer formulations of the type according to the invention are those which comprise 82–40 wt. % cellulose nitrate and 18–60 wt. % pasticizer based on formylated polyurethanes.

In the cellulose nitrate/plasticizer combinations according to the invention there is the possibility of replacing some of the formylated polyurethane by other plasticizers known for cellulose nitrate (cf e.g. A. Kraus, Handbuch der Nitrocelluloselacke [Handbook of Nitrocellulose Paints], Part 3:

Weichmachungsmittel [Plasticizers], Wilhelm Pansegrau Verlag, Berlin-Wilmersdorf, 1961). Suitable other plasticizers are, inter alia, phthalates, such as e.g. dibutyl phthalate or dioctyl phthalate, citric acid esters, such as e.g. acetyl tributyl citrate, phosphoric acid esters, such as e.g. 2-ethylhexyl diphenyl phosphate, adipates, such as e.g. diisobutyl adipate, sebacates, such as e.g. dibutyl sebacate, epoxidized or ethoxylated esters of naturally occurring fatty acids or triglycerides, such as e.g. epoxidized soya bean oil (ESO) or ethoxylated castor oil, sugar derivatives, such as e.g. sucrose acetate isobutyrate (SAIB), and glycerol derivatives, such as e.g. glycerol di- or triacetate.

The cellulose nitrate/plasticizer combinations according to the invention are prepared by direct application of the plasticizer on to the water-moist cellulose nitrate in a mixer which does not have a compacting effect, such as is described in DE 1 203 652 and the following examples.

The invention also provides the use of the new NC chips as a paint raw material for coating any desired substrates. For adaptation to particular profiles of requirements the NC chips according to the invention can be combined here with further paint raw materials. Examples which may be mentioned are the use of the paint binder formulations according to the invention in paints for wood, paper, leather, textiles and films and in printing inks.

The paints are applied by the conventional methods of paint technology, such as e.g. spraying, pouring, dipping or rolling.

The following examples are intended to illustrate the invention without limiting it.

EXAMPLES

Example 1

62.55 kg of a water-moist cellulose nitrate (standard type A 30 according to DIN 53 179) with a water content of 28.1% are introduced loosely into a horizontal, cylindrical mixer of 300 l nominal volume, equipped with a high-speed stirrer and atomizing apparatus, such that the filling level of the mixer is about 85% of the nominal volume. 9 Kg of CENTROPLAST® FU 112 formylated polyurethane (=polymeric plasticizer based on a formylated, aliphatic polyurethane from Vianova Resins), heated to 60° C., are then sprayed on to the water-moist cellulose nitrate via the spraying apparatus in the course of 10 minutes with the stirrer running. During this process, the cellulose nitrate loses its fibrous structure and is converted into free-flowing granules, which are then milled to a nonwoven. The nonwoven is then cut to small platelets (the so-called chips). Finally, the chips are dried to a water content of <2%.

Example 2

A mixer as described in example 1, which is provided with an additional double-walled jacket, is filled with 48.1 kg of a water-moist cellulose nitrate (standard type E 24 according to DIN 53 179) with a water content of 27.2 wt. %. The mixer is then heated up to 100° C. by means of steam, and 7.7 kg CENTROPLAST® FU 210 formylated polyurethane (=polymeric plasticizer based on p formylated, aliphatic polyurethane from Vianova Resins), heated to 600° C., are then sprayed on to water-moist cellulose nitrate in the course of 10 minutes. Finally, after mixing is carried out for 5 minutes and the granular product is worked up further as described under example 1.

What is claimed is:

1. A plasticized composition comprising 40 to 82 percent cellulose nitrate and 18 to 60 percent formylated polyurethane, said percent, both occurrences, being relative to the weight of the composition, said cellulose nitrate having nitrogen content of less than 12.6% relative to the weight of said cellulose nitrate.

2. The composition of claim 1 further comprising at least one plasticizer selected from the group consisting of ester of phthalic acid, ester of citric acid, ester of phosphoric acid, esters of adipic acid, esters of sebacic acid, epoxidized ester of fatty acid, ethoxylated ester of fatty acid, sugar derivatives and glycerol derivatives.

3. The composition of claim 1 wherein said nitrogen content is 10.0 to 12.6%.

4. Paint comprising the composition of claim 1.

5. A process for making the composition of claim 1 comprising directly applying formylated polyurethane on water-moist cellulose nitrate in a mixer which does not have a compacting effect.

6. A paint composition comprising a plasticized composition comprising, (i) 40 to 82 percent by weight cellulose nitrate, based on the weight of said plasticized composition, said cellulose nitrate having a nitrogen content of less than 12.6 percent by weight, based on the weight of said cellulose nitrate; and (ii) 18 to 60 percent by weight of a formylated polyurethane, based on the weight of said plasticized composition.

7. A process for making a plasticized composition comprising (i) 40 to 82 percent by weight cellulose nitrate, based on the weight of said plasticized composition, said cellulose nitrate having a nitrogen content of less than 12.6 percent by weight, based on the weight of said cellulose nitrate; and (ii) 18 to 60 percent by weight of a formylated polyurethane, based on the weight of said plasticized composition, said process comprising applying directly said formylated polyurethane on said cellulose nitrate, said cellulose nitrate being water-moist, in a mixer which does not have a compacting effect.

* * * * *